United States Patent
Platt

[15] 3,659,213
[45] Apr. 25, 1972

[54] CONTROL SYSTEM INCLUDING A LIMITER HAVING FIXED OFFSETS

[72] Inventor: Walter A. Platt, Fair Lawn, N.J.
[73] Assignee: The Bendix Corporation
[22] Filed: Feb. 22, 1971
[21] Appl. No.: 117,479

[52] U.S. Cl............................328/171, 307/202, 307/219, 307/237, 328/8, 328/172, 328/173
[51] Int. Cl..................H03b 3/02, G06f 11/08, H03k 5/08
[58] Field of Search...................307/204, 219, 237, 53, 202, 307/55, 62; 328/7, 8, 9, 10, 11, 159, 169, 171, 172, 173, 175; 244/77 M, 77 DZ; 340/146.1 BE

[56] References Cited

UNITED STATES PATENTS

| | | |
|---|---|---|
| 2,828,417 | 3/1958 | Fleming, Jr. et al. ..............307/237 X |
| 3,166,276 | 1/1965 | Goerner et al......................307/237 X |
| 3,437,836 | 4/1969 | Hull......................................307/237 |
| 3,437,837 | 4/1969 | Hull......................................307/237 |
| 3,475,743 | 10/1969 | Moreines ...........................340/213 R |
| 3,492,588 | 1/1970 | Woodward, Jr....................307/204 X |
| 3,546,598 | 12/1970 | McCauley...........................328/104 X |
| 3,586,991 | 6/1971 | Vosteen..............................307/202 X |

Primary Examiner—Donald D. Forrer
Assistant Examiner—L. N. Anagnos
Attorney—Anthony F. Cuoco and Plante, Hartz, Smith & Thompson

[57] ABSTRACT

A control system having redundant channels and including limiting means whereby maximum and minimum limits for redundant control signals are a function of a desired offset.

8 Claims, 3 Drawing Figures

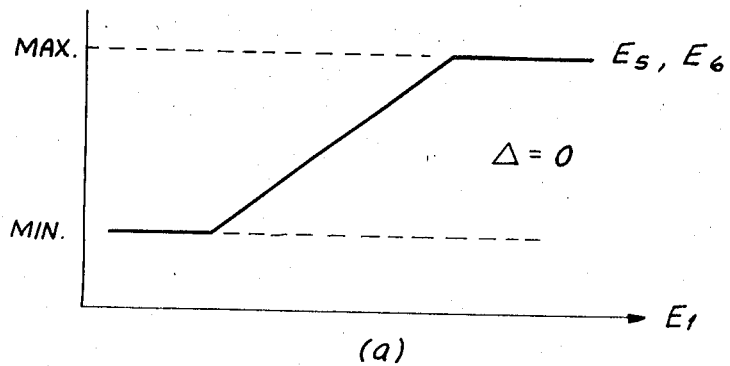
(a)
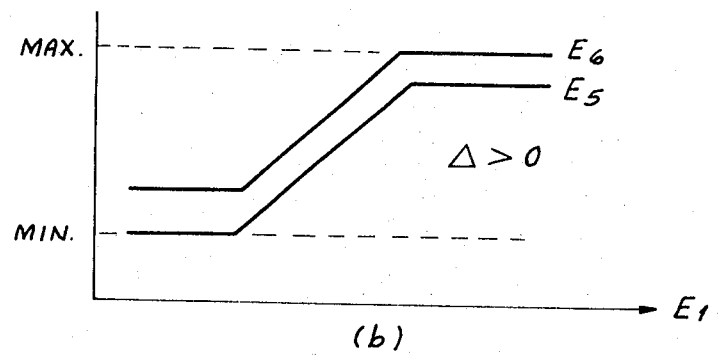
(b)
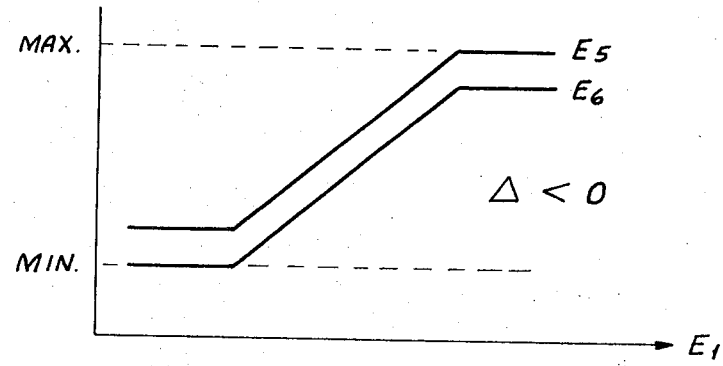
(c)
Fig 3

CONTROL SYSTEM INCLUDING A LIMITER HAVING FIXED OFFSETS

BACKGROUND OF THE INVENTION

1. Field of the Invention

This invention relates to redundant control systems and, more particularly, to control systems of the type described wherein a fixed offset is maintained between two or more redundant control signals.

2. Description of the Prior Art

It is frequently desirable to have maximum and minimum limits for control system signals. In redundant systems, such as those used for flight control purposes, it is desired to maintain fixed offsets between two or more redundant signals and the limits for these signals must be a function of this offset. The invention provides an arrangement for accomplishing this purpose which is particularly simple as compared to devices now known in the art.

SUMMARY OF THE INVENTION

This invention contemplates a control system having redundant channels and limiting means for limiting the redundant control signals to maximum and minimum levels as a function of a desired offset. The limiter input and output signals for one of the channels are summed and the summation signal is summed with the input signal to another channel. The latter summation signal is limited by the limiter in the other channel so that in effect the first signal to reach the limit level is limited and the other signals are clamped to maintain the offset.

The main object of this invention is to provide maximum and minimum limits for redundant control system signals.

Another object of this invention is to provide said limits so that a fixed offset is maintained between two or more redundant signals with the limits being a function of this offset.

Another object of this invention is to limit the first signal to reach a limit level and to clamp the other signals to maintain the desired offset.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 3 is a graphical representation showing maximum and minimum signal levels for varying degrees of offset.

DESCRIPTION OF THE INVENTION

Figure 1:
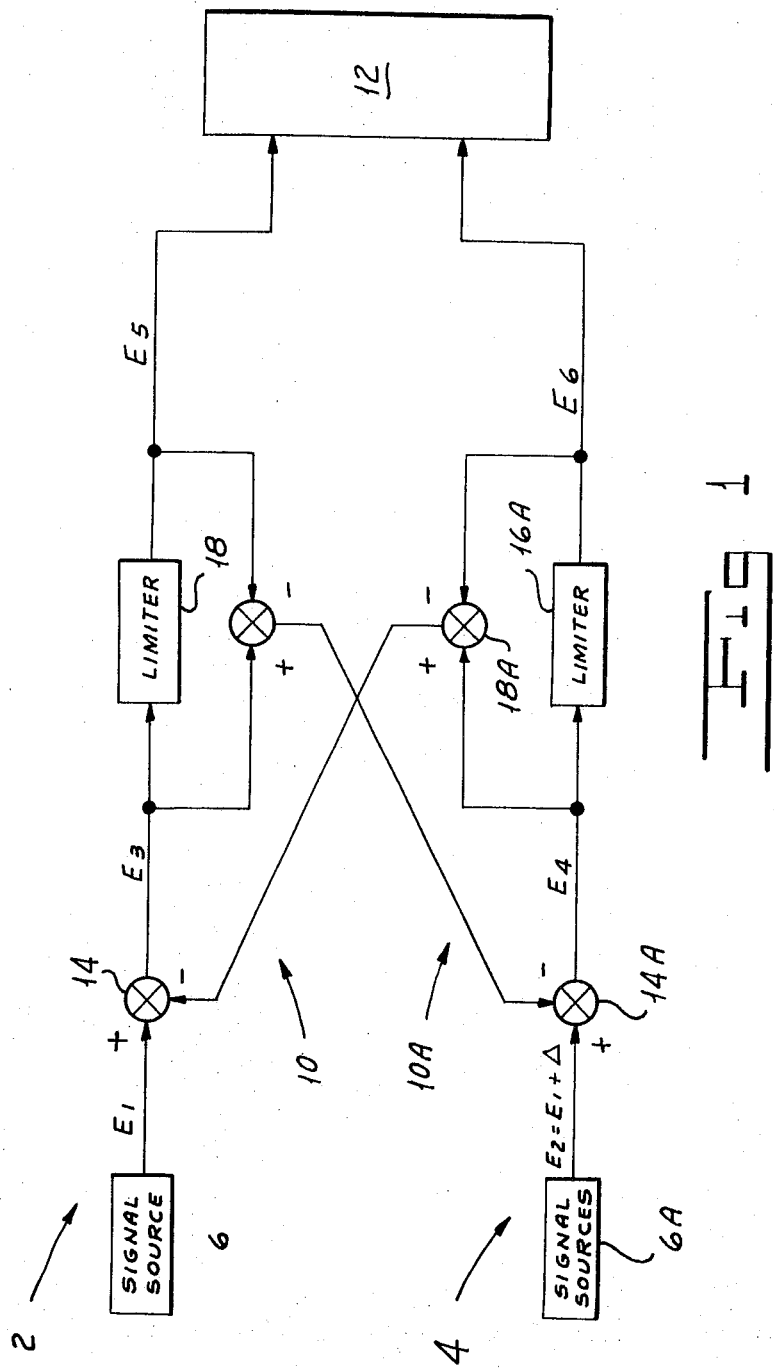
FIG. 1 is a block diagram of a control system including limiting means according to the invention.

Figure 1 shows a control system including a channel 2 having a signal source 6 for providing a control signal $E_1$ and a redundant channel 4 having a signal source 6A for providing a control signal $E_2$. Signal $E_2$ is equal to the sum of signal $E_1$ plus a predetermined offset designated as $\Delta (E_2 = E_1 + \Delta)$. The control system is of the redundant type described and broadly claimed in U. S. Pat. No. 3,475,743 issued on Oct. 28, 1969 to Harold Moreines and assigned to The Bendix Corporation assignee of the present invention. In addition, signal sources 6 and 6A may be of the type well known in the art and including means for providing a command signal, means for providing a follow-up signal and means for summing the command and follow-up to provide a control signal. Devices of this type are described at pg. 81, Fig. 117, Synchros and Servomechanisms, published in 1954 by the Philco Corp., Philadelphia, Pennsylvania.

Channel 2 includes limiting means designated by the numeral 10 for connecting signal means 6 to a device or devices 12 operated by control signal $E_1$ applied through the limiting means. Channel 4 includes limiting means designated by the numeral 10A for connecting signal means 6A to device 12. In the event of a failure in channel 2 so that signal source 6 is ineffective for providing signal $E_1$ to operate device 12, the device is operated by signal $E_2$ applied through limiting means 10A as will now be understood by those skilled in the art.

Limiting means 10 includes a summing means 14 connected to signal means 6 and a limiter 16 connected at its input to summing means 14 and connected at its output to device 12. A summing means 18 is connected to the input and output of limiter 16 for summing the limiter input and output signals.

Limiting means 10A includes a summing means 14A connected to signal means 6A and a limiter 16A connected at its input to summing means 14A and connected at its output to device 12. A summing means 18A is connected to the input and the output of limiter 16A for summing the limiter input and output signals.

Summing means 18A is connected to summing means 14 which sums signal $E_1$ from signal means 6 and the summation signal from summing means 18A to provide a signal $E_3$. Limiter 16 limits signal $E_3$ and provides a limited signal $E_5$ which is applied to device 12.

Summing means 18 is connected to summing means 14A which sums the signals from signal means 6A and from summing means 18 and provides a signal $E_4$. Limiter 16A limits signal $E_4$ and provides a limited signal $E_6$ which is applied to device 12.

If it is assumed that signals $E_3$ and $E_4$ are within the respective limits provided by limiters 16 and 16A, then signals $E_3 - E_5 = 0$ and signals $E_4 - E_6 = 0$. That is, the outputs from summing means 18 and 18A are each 0 and therefore signals $E_5 = E_1$ and signals $E_6 = E_4 = E_2$ as desired.

If offset $\Delta$ is larger than 0, (positive) then, as signals $E_2$ and $E_1$ increase toward the larger limit, signal $E_2$ will first reach the limit. For increases in signals $E_2$ and $E_1$ beyond the limit, signal $E_6$ will remain at the limit value but signal $E_4$ will increase proportionately to signals $E_2$ and $E_1$. This increase in signal $E_4$ above the limit value will just cancel the increase in signal $E_1$ above the value it had when signal $E_2$ reached the maximum limit. Thus, signal $E_3$ will remain at this value. Since for the conditions assumed, signal $E_3$ must be less than the limit value, signal $E_3 - E_5$ remains at 0.

As signals $E_2$ and $E_1$ decrease from their mid-range values, signal $E_1$ will reach the lower limit first. For values of signals $E_2$ and $E_1$ below this limit, signal $E_2 - E_5$ will decrease proportionately. Similarly, as signals $E_2$ and $E_1$ decrease from their mid-range values, signal $E_1$ will reach the lower limit first. For values of signals $E_2$ and $E_1$ below this point, signal $E_3 - E_5$ will decrease proportionately to signal $E_2$ and will cancel the decrease in signal $E_2$. This results in signal $E_4$ holding the value that signal $E_2$ had at the point that signal $E_1$ reached the lower limit. Since, for the conditions assumed this value of signal $E_4$ must be larger than the lower limit, signal $E_4 - E_6 = 0$. By an identical analysis it can be shown that when offset $\Delta$ is less than 0 (negative), the limits are not exceeded and the offset is preserved in the limit.

These characteristics of the invention are shown in the graphical illustration of figure 3, wherein (a) when $\Delta$ equals zero, signals $E_5$ and $E_6$ are coincident; (b), when $\Delta$ is less than zero, signal $E_6$ has a higher maximum value than signal $E_5$ and signal $E_5$ has a lower minimum value than signal $E_6$; and (c), when $\Delta$ is greater than zero, signal $E_5$ has a higher maximum value than signal $E_6$ and signal $E_6$ has a lower minimum value than signal $E_5$.

Figure 2:
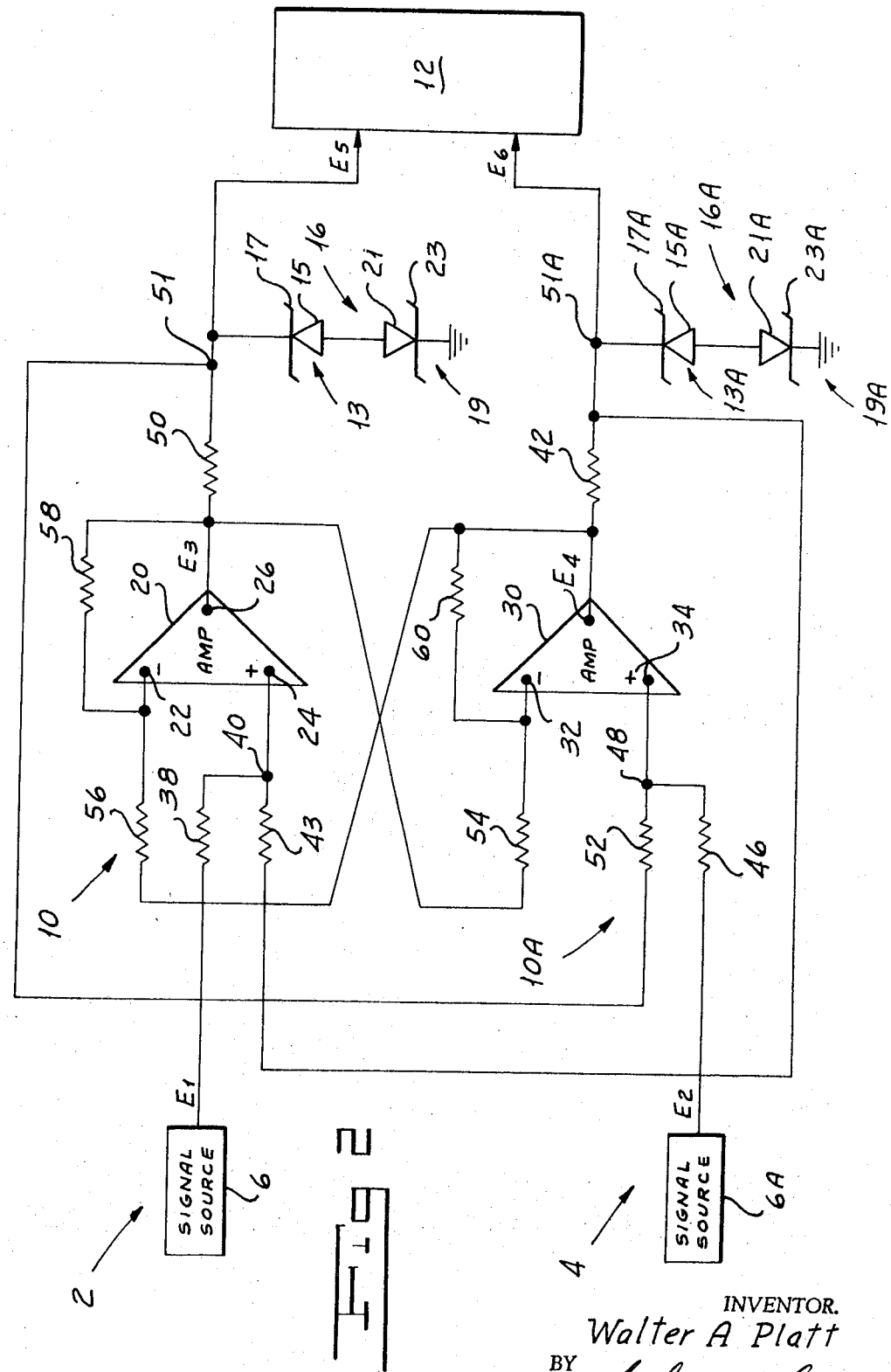
FIG. 2 is an electrical schematic diagram showing the limiting means of FIG. 1 in substantial detail.

Figure 2 is an implementation of the invention using d.c. operation amplifiers as summing devices and zener diode limiters. Thus, an operational amplifier 20 has an inverting input terminal 22, a non-inverting input terminal 24 and an output terminal 26. An operational amplifier 30 has an inverting input terminal 32, a non-inverting input terminal 34, and an output terminal 36.

Signal source 6 is connected through a resistor 38 to non-inverting input terminal 24 of amplifier 20 and output terminal 36 of amplifier 30 is connected through a resistor 42 and a resistor 43 to terminal 24.

Signal source 6A is connected through a resistor 46 to non-inverting input terminal 34 of amplifier 30 and output terminal 26 of amplifier 20 is connected through a resistor 50 and a resistor 52 to terminal 34.

Output terminal 26 of amplifier 20 is connected through a resistor 54 to inverting input terminal 32 of amplifier 30 and output terminal 36 of amplifier 30 is connected through a resistor 56 to inverting input terminal 22 of amplifier 20. Inverting input terminal 22 and output terminal 26 of amplifier 20 are connected through a feedback resistor 58 and inverting input terminal 32 and output terminal 36 of amplifier 30 are connected through a feedback resistor 60.

Output terminal 26 of amplifier 20 is connected through resistor 50 to limiter 16 and output terminal 36 of amplifier 30 is connected through resistor 42 to limiter 16A.

Limiter 16 includes a zener diode 13 having a cathode 17 connected to resistor 50 and an anode 15 connected to an anode 21 of a zener diode 19. Zener diode 19 has a grounded cathode 23.

Limiter 16A includes a zener diode 13A having a cathode 17A connected to resistor 42 and an anode 15A connected to an anode 21A of a zener diode 19. Zener diode 19A has a grounded cathode 23A. Cathode 17 of zener diode 15 in limiter 16 is connected to device 12 and cathode 17A of zener diode 13A in limiter 16A is connected to device 12.

The use of zener diodes for signal limiting purposes and connected as shown is well known in the art and is described at pages 412–414, Electronics for Scientists, Molmstadt, et al., Benjamin, New York 1963.

In operation, the input to limiter 16 and the output therefrom are summed at a point 51. The summation signal thus provided is summed with signal $E_2$ from signal source 6A at point 48.

The input to limiter 16A and the output therefrom are summed at a point 51A. The summation signal is summed with signal $E_1$ from signal source 6 at point 40.

Amplifier 20 operates on the summation signal at point 40 and on the output from amplifier 30 to provide signal $E_3$ at output terminal 26 and amplifier 30 operates on the summation signal at point 48 and on the output from amplifier 20 to provide signal $E_4$ at output terminal 34. Signal $E_3$ is limited by limiter 16 to provide signal $E_5$ and signal $E_4$ is limited by limiter 16A to provide signal $E_6$.

In accordance with the foregoing description, the limiter of the invention provides a particularly simple circuit arrangement which limits the signals in each channel as a function of a desired offset. This is accomplished by limiting the first signal to reach the limit and by clamping the other signals to maintain the desired offset.

Although but a single embodiment of the invention has been illustrated and described in detail, it is to be expressly understood that the invention is not limited thereto. Although the invention has been described with reference to two channels, the extension to more than two channels will now be understood. Various changes may also be made in the design and arrangement of the parts without departing from the spirit and scope of the invention as the same will now be understood by those skilled in the art.

What is claimed is:

1. A redundant control system comprising:
   a first channel including means for providing a control signal and a limiter;
   a second channel including means for providing a redundant control signal and a limiter;
   means for combining the first channel limiter input and output signals for providing a first combined signal;
   means for combining the second channel limiter input and output signals for providing a second combined signal;
   means for combining the control signal and the second combined signal, and the limiter in the first channel being connected to said combining means for limiting the signal therefrom;
   means for combining the redundant control signal and the first combined signal, and the limiter in the second channel being connected to said combining means for limiting the signal therefrom; and
   means connected to both of the limiters for using the limited signals therefrom.

2. A control system including a plurality of channels, each channel comprising:
   means for providing a control signal;
   a limiter;
   means for combining limiter input and output signals to provide a combined signal;
   means for combining the control signal from one channel with the combined signal from another channel to provide another combined signal; and
   the limiter being connected to said last mentioned combining means with the combined signal therefrom being the input signal to the limiter.

3. A control system including a plurality of channels, each channel comprising:
   means for providing a control signal;
   a limiter;
   means for combining limiter input and output signals from one channel with the control signal from another channel; and
   the limiter being connected to the combining means, with the combined signal therefrom being the input signal to the limiter.

4. A control system as describe by claim 3, wherein the means for combining limiter input and output signals from one channel with the control signal from another channel includes:
   means connected to the limiter in the one channel for summing the input and output signals therefrom; and
   means connected to the summing means and to the control signal means in the other channel for summing the signals therefrom.

5. A control system as described by claim 3, wherein the means for combining limiter input and output signals from one channel with the control signal from another channel includes:
   an operational amplifier having an inverting input terminal, a non-inverting input terminal and an output terminal;
   the limiter in the one channel and the control signal means in the other channel connected to the non-inverting input terminal of the amplifier in the other channel; and
   the output terminal of the amplifier in the one channel connected to the inverting input terminal of the amplifier in the other channel.

6. A system as described by claim 3, wherein:
   the control signal in the one channel equals the control signal in the other channel plus a predetermined offset.

7. A control system as described by claim 1, wherein:
   the second channel control signal equals the first channel control signal plus a predetermined offset;
   when the offset is zero the limited signals from the limiters in the first and second channels have corresponding maximum and minimum levels.
   when the offset is less than zero the limited signal from the limiter in the second channel has higher maximum and minimum levels than the limited signal from the limiter in the first channel; and
   when the offset is greater than zero the limited signal from the limiter in the first channel has higher maximum and minimum levels than the limited signal from the limiter in the second channel.

8. A system as described by claim 3, including:
   means connected to the limiters in the plurality of channels for utilizing the limited signals therefrom.

* * * * *